3,429,965
AVIAN POX VIRUS VACCINE AND PROCESS
OF PREPARING SAME
Emil F. Gelenczei, Salisbury, Md., and Hiram N. Lasher, Millsboro, Del., assignors to Sterling Drug Inc., New York, N.Y., a corporation of Delaware
No Drawing. Filed Aug. 1, 1966, Ser. No. 569,049
U.S. Cl. 424—89　　　　　　　　　　　　　　10 Claims
Int. Cl. A61k 23/02; C12k 9/00

This invention relates to the making of avian pox virus vaccines. In particular the invention resides in the process which comprises propagating an avian pox virus in a tissue culture medium of duck embryo cells and in the vaccines prepared from the avian pox virus thus propagated.

Avian pox virus vaccines have heretofore been prepared from strains of fowl pox, turkey pox or pigeon pox viruses which have been propagated in chick embryos or in tissue cultures of chick embryos. Since tissues and cell cultures of chick embryo origin may contain harmful viruses, especially avian leucosis virus, which is the causative agent of one of the most costly diseases of poultry, special precautions and steps must be taken in the preparation of said vaccines produced from chick embryonic tissues or cell cultures.

It occurred to us that this problem of viral contamination might be obviated by use of embryonic duck tissue culture for propagation of the avian pox virus since the tissues of duck embryos are free of most viruses known to infect chickens, in particular, the avian leucosis virus. Such an approach, however, did not appear too promising in view of the teaching in the literature that duck eggs were much less susceptible to fowl pox virus than chicken eggs. As early as 1937, Brandly [J. Am. Vet Med. Assn. 90, 479–487 (1937)] had found that a thirty-fold greater end point concentration of the fowl pox virus was necessary to initiate infection in duck eggs than needed to do the same in chicken eggs. This had been interpreted by Brandly, and later by others, as a lower degree of susceptibility of duck-egg membranes to infection with fowl pox virus. Brandly also noted an apparent increase in the resistance of duck eggs to the virus after the fifteenth day of incubation. While slightly more than half of the eggs inoculated on the sixteenth day had showed evidences of infection, infection had not been noted in duck eggs inoculated on the eighteenth day. Over the past thirty years, since Bradly's findings, duck eggs have not been used to propagate avian pox virus for vaccine preparation.

Notwithstanding Brandly's teaching, we now surprisingly have found that avian pox viruses can be propagated in a tissue culture medium of duck embryo cells as readily as in a tissue culture medium of chick embryo cells and, further, that viruses thus propagated in both duck and chick cell culture systems are equally suitable for immunization of chickens against fowl pox.

The manner and process of making and using the invention will now be fully described as to enable a person skilled in the art of preparing vaccines to make and use the same.

The fowl pox, pigeon pox and turkey pox viruses used in the process of the invention were vaccine strains used for production of commercial pox vaccines, said strains having been previously propagated in embryonating chicken eggs.

The embryonic duck tissue cultures used in our process are prepared by combination of known procedures. In practicing our invention, duck fibroblast cell cultures were prepared and maintained according to the general procedure described by Dulbecco and Vogt [J. Exptl. Med. 99, 167–182 (1954)] from the preparation of chicken embryo tissues. The growth medium consisted of Hank's salt solution containing 0.5% lactalbumin hydrolysate and 10% lamb serum. The duck fibroblast cells were suspended in the growth medium dispensed in 32 oz. bottles, and incubated at 37° C. The monolayers of duck fibroblast cells were generally well developed after about twenty-four hours. After two days incubation, the growth medium was discarded and replaced with maintenance medium, which consisted of tris-citrate [tris(hydroxymethyl)aminomethane and citric acid] buffered balanced salt solution containing 0.5% lactalbumin hydrolysate and 0.1% yeast extract. Considerable flexibility can be exercised in preparation of the tissue culture, as well as in the usage of various media.

Inoculation of the tissue cell culture with avian pox virus can be done at different stages of cell development with equally satisfactory results. For example, this can be done initially at the planting of the cells before the cells are attached to the glass, or at a later stage, e.g., one day following incubation of the cells or at the removal of the growth medium.

The inoculated cell cultures were incubated at the ordinary temperatures that are customary for growth of the avian pox virus in animal cells, at approximately 37° C. The temperature, however, is not critical and the incubation can be run over a temperature range of from about 30° C. to about 40° C. About three to five days of incubation following virus inoculation, cytopathogenic effect (CPE) was noticeable by microscopic observation. At this time both cells and fluids were harvested and the resulting virus suspension was used for serial passages in duck embryo tissue cultures. After a relatively small number of passages of the avian pox viruses in duck embryo tissue cultures following the above described process, satisfactory titers were obtained for vaccine production, e.g., at least about two to five passages of the pigeon pox virus, at least about three to five passages of the fowl pox virus, and at least about six to eight passages of the turkey pox virus. A larger number of passages can be used, if desired.

For vaccine preparation the virus suspension was combined with a stabilizer, e.g., an aqueous solution consisting of 5% dextran and 5% sodium glutamate; however, any suitable stabilizer can be used. Then the stabilized virus suspension was lyophilized. The dried product is stabile and can be reconstituted by addition of a standard diluent, e.g., an aqueous solution of 20% glycerin, prior to its administration as a vaccine.

All of the above steps are run under sterile conditions and standard ARS test procedures for sterility, potency, safety, virulence and identity are carried out as required.

The best mode contemplated by us in carrying out our invention will now be set forth as follows:

Preparation of duck embryo tissue cultures

Trypsinized cultures of duck embryo fibroblast cell cultures were prepared using the above-noted process of Dulbecco and Vogt, with slight modification. Embryos from 10–14 day old embryonating duck eggs were used for the preparation of monolayer cell cultures. The embryos were aseptically collected and minced to 3–5 mm. pieces. The minced tissues were repeatedly washed with Hank's balanced salt solution (BSS) until the supernatant fluid was completely cleared of blood cells and cellular debris. The washed tissues were resuspended in 0.25% trypsin solution. Ten ml. of the trypsin solution was added for each embryo. The tissues were then agitated at room temperature using a trypsinizing flask and a magnetic stirring device. The agitation was continued until a fairly homogenous suspension with relatively few large particles was obtained. This process took about one to two hours. The trypsinized tissue suspension was filtered through two layers of sterile gauze and centrifuged at 800 r.p.m. for a ten minute period. The supernatant fluid was discarded. The cells were resuspended in BSS and centrifuged again. The supernatant fluid was discarded. The packed cells were resuspended in 1:400 dilution with the growth medium, and were agitated through the dispensing process. The growth medium used for cell propagation consisted of Hank's salt solution containing 0.5% lactalbumin hydrolysate and 10% lamb serum. Penicillin at the rate of 50 units and 0.50 microgram of dihydrostreptomycin per ml. of fluid were also optionally added to the medium. Sixty to one hundred ml. of the growth medium containing the resuspended cells was added to each culture flask (32 oz. prescription bottle of modern oval type) and incubated at 37° C.

Avian pox viruses

The fowl pox, pigeon pox and turkey pox viruses which were successfully propagated in embryonic duck tissue cultures by our process had originally been propagated on the chorioallantoic membranes of nine to eleven day old embryonating chicken eggs. As noted hereinabove, after a relatively small number of passages of the above pox viruses in duck embryo tissue cultures, satisfactory titers for vaccine production were obtained.

Inoculation and propagation

Two methods of virus inoculation were used as follows:

Inoculation of virus at planting of cells.—The seed virus was added to the growth medium to give a final dilution of 1:100. Sixty to 100 ml. of growth medium was added to each 32 oz. culture flask. The inoculated cultures were incubated at 37° C. for two days, after which the medium was removed and 100 ml. fresh maintenance medium was added to each flask. The maintenance medium consisted of triscitrate buffered balanced salt solution containing 0.5% lactalbumin hydrolysate and 0.1% yeast extract. The cultures were then incubated for an additional two to three days. Three to five days following virus inoculation CPE was noticeable by microscopic observation.

Inoculation of virus at changing of cell culture medium.—Monolayers of duck embryo fibroblast cells were confluent forty-eight hours following planting. At that time, the growth medium was removed and discarded. The seed virus was added to the maintenance medium to give a final dilution of 1:100. One hundred ml. of maintenance medium was then added to each 32 oz. culture flask. The inoculated cultures were incubated at 37° C. for four to five days. At that time CPE was well noticeable by microscopic observation.

Virus harvest and preservation

Both cells and fluids were harvested. Cell monolayers were disrupted by the freeze-thawing process. Electric deep freeze in the range of about −65° C. to −79° C. was used for freezing. Thawing was carried out at 37° C. After thawing, the virus fluids were removed from the flasks and pooled. The pooled virus material was ground in a blender. The homogenous virus fluid was combined in equal proportion with the stabilizer. The stabilized virus fluid was dispensed into vials and maintained at −40° C. or lower temperature until freeze-drying. The stabilized virus fluid in vials was lyophilized and the resulting freeze-dried vaccine was stored at 4° C. For usage, the duck tissue culture (DTC) propagated pox vaccines were reconstituted by addition of the standard diluent.

DTC pigeon pox virus vaccine

The pigeon pox virus strain used here had been passed once in embryonic chicken fibroblast cells and, as described hereinabove, twice in embryonic duck fibroblast cells. The resulting lyophilized vaccine contains the blended virus and stabilizer. The vaccine has the ability to give good takes and immunity in chickens one day of age or older when applied by the wing web stab method.

Potency tests on two serials of DTC pigeon pox virus vaccine.—Two serials (No. 9001 and No. 9002) of DTC pigeon pox vaccine were tested for potency in one-day-old and 7-week-old broilers. Groups of twenty one-day-old chickens and groups of ten seven-week-old chickens were vaccinated with the two serials. The reconstituted vaccines were administered to chickens by the wing-web stab method. Ten non-vaccinated control birds from the original groups were challenged with a fowl pox virus having a titer of $10^{6.7}$ $EID_{50}$ per ml. The challenge virus was administered by the wing-web stab method in the opposite wing from that used for vaccination. Reactions were observed eight days following challenge. The results of potency test appear in Table I.

TABLE I.—RESULTS OF POTENCY TESTS CONDUCTED WITH TWO SERIALS OF DTC-PROPAGATED PIGEON POX VACCINE IN ONE-DAY OLD AND SEVEN-WEEK OLD CHICKENS

| Vaccine serial | Bird age | Reactions following vaccination [a] | | | Total | Susceptible/ challenged | Percentage of Protected |
|---|---|---|---|---|---|---|---|
| | | Det. | Sl. | Mod. | | | |
| 9001 | One day | [b] 4 | 5 | 8 | [c] 17/20 | 1/18 | 94 |
| | 7 weeks | 4 | 4 | 2 | 10/10 | 1/10 | 90 |
| 9002 | One day | 7 | 4 | 1 | 12/20 | 2/18 | 89 |
| | 7 weeks | 1 | 8 | 1 | 10/10 | 0/10 | 100 |
| Controls | One day | | | | | 10/10 | 0 |
| | 7 weeks | | | | | 10/10 | 0 |

[a] Det.=detectable, i.e., palpable mild reaction; Sl.=slight, i.e., visible slight swelling; Mod.=moderate, i.e., definite moderate swelling.
[b] Number of chickens reacted.
[c] Number of reacting/number vaccinated.

All vaccinated chickens showed only mild or moderate local reactions seven days following vaccination. The reactions were always limited to the area of virus application. The virus did not spread from the site of inoculation to other areas of the body. Satisfactory protection developed in the vaccinated chickens against the challenge virus. All control birds showed typical fowl pox reactions following challenge.

Minimum effective dose determination.—The minimum effective dose of this DTC pigeon pox virus vaccine was studied in 7-week-old broilers. The freeze-dried vaccine was reconstituted with the standard diluent and then diluted decimally $10^{-1}$ through $10^{-4}$. The virus titer of the reconstituted vaccine was determined simultaneously with the vaccination process. The vaccine was administered to birds by the wing-web stab method. Ten birds were used for each vaccine dilution and ten non-vaccinated birds from the original group were retained and kept separately as controls. Vaccine reactions were observed eight days following vaccine administration. Two weeks following vaccination, all vaccinated birds and controls were challenged with a fowl pox virus having a titer of $10^{6.7}$ $EID_{50}$ per ml. The challenge virus was administered by the wing-web stab method in the opposite wing from that used for vaccination. Reactions were observed seven days following challenge. Results are shown in Table II.

TABLE II.—THE RESPONSE OF SEVEN-WEEK OLD CHICKENS TO VACCINATION WITH DIFFERENT CONCENTRATIONS OF DTC-PROPAGATED PIGEON POX VIRUS

| Virus Dilution | Virus Concentration ($Log_{10}EID_{50}$/ml.) | Take Reaction From Vaccination | Take Reaction From Challenge | Percent Immune |
|---|---|---|---|---|
| $10^{-0}$ | 5.0 | a 10/10 | b 0/10 | 100 |
| $10^{-1}$ | 4.0 | 10/10 | 1/10 | 90 |
| $10^{-2}$ | 3.0 | 6/10 | 5/10 | 50 |
| $10^{-3}$ | 2.0 | 1/10 | 7/10 | 30 |
| $10^{-4}$ | 1.0 | 0/10 | 10/10 | 0 |
| Unvaccinated Controls | | | 10/10 | 0 | a Number reacted/number vaccinated.
b Number reacted/number challenged.

A ten times dilution of the regular vaccine dose protected 90% of the vaccinated chickens against the challenge virus. This result indicates that a virus concentration of $10^4$ $EID_{50}$ per ml. seems to be the lowest vaccine titer to achieve satisfactory immunity in chickens.

DTC fowl pox virus vaccine

The fowl pox virus strain used here was passed four times in embryonic duck fibroblast cells by the process described above. The resulting lyophilized vaccine contains the blended virus and stabilizer. The vaccine has the ability to give good takes and immunity in chickens and turkeys four to eighteen weeks of age.

Potency tests on DTC fowl pox virus vaccine.—This duck tissue culture (DTC) modified fowl pox virus vaccine was tested for potency in one-day-old and four-week-old broilers. One group of twenty one-day-old chickens and one group of ten four-week-old chickens were vaccinated with the vaccine. The reconstituted vaccine was administered to chickens by the wing-web stab method. Ten non-vaccinated control birds from the original groups were retained and kept separately. Vaccine reactions were observed eight days following virus administration. Two weeks following vaccination, all vaccinated birds and controls were challenged with a fowl pox virus having a titer of $10^{6.7}$ $EID_{50}$ per ml. The challenge virus was administered by the wing-web stab method in the opposite wing from that used for vaccination. Reactions were observed seven days following challenge. The results of potency test appear in Table III.

the vaccination process. The vaccine was administered to birds by the wing-web stab method. Ten birds were used for each vaccine dilution and ten non-vaccinated birds from the original groups were retained and kept separately as controls. Vaccine reactions were observed eight days following vaccine administration. Two weeks following vaccination, all vaccinated birds and controls were challenged with a fowl pox virus having a titer of $10^{6.7}$ $EID_{50}$ per ml. The challenge virus was administered by the wing-web stab method opposite the site of vaccination. Reactions were observed seven days following challenge. Results are shown in Table IV.

TABLE IV.—THE RESPONSE OF FOUR-WEEK-OLD CHICKENS TO VACCINATION WITH DIFFERENT CONCENTRATIONS OF DTC-PROPAGATED FOWL POX VIRUS

| Virus Dilution | Virus Concentration ($Log_{10}EID_{50}$/ml.) | Take Reaction from Vaccination | Take Reaction from Challenge | Percent Immune |
|---|---|---|---|---|
| $10^{-0}$ | 5.2 | a 10/10 | b 0/10 | 100 |
| $10^{-1}$ | 4.2 | 10/10 | 0/10 | 100 |
| $10^{-2}$ | 3.2 | 5/10 | 3/10 | 70 |
| $10^{-3}$ | 2.2 | 0/10 | 7/10 | 30 |
| $10^{-4}$ | 1.2 | 0/10 | 10/10 | 0 |
| Unvaccinated Controls | | | 10/10 | 0 | a Number reacted/number vaccinated.
b Number reacted/number challenged.

The results shown here are similar to the results obtained in the minimum effective dose experiment for the pigeon pox vaccine. According to the results, a ten times dilution of the regular vaccine dose protected 100% of the vaccinated chickens against challenge virus. The result indicates that a DTC fowl pox virus concentration of at least $10^4$ $EID_{50}$/ml. is needed in the vaccine to obtain satisfactory immunity in chickens.

Comparison of DTC and CTC avian pox virus vaccines

The following comparative data show that fowl pox, pigeon pox and turkey pox viruses grew equally well in duck and chicken embryo tissue cell cultures. The data also show that fowl pox and pigeon pox viruses propagated in both tissue cell culture systems produced similar "take" reactions and comparable immune responses in different TABLE III.—RESULTS OF POTENCY TESTS CONDUCTED WITH DTC-PROPAGATED FOWL VIRUS VACCINE IN ONE-DAY-OLD AND FOUR-WEEK-OLD CHICKENS

| Bird age | Reactions following vaccination a | | | | Total | Challenge results | |
|---|---|---|---|---|---|---|---|
| | Det. | Sl. | Mod. | Sev. | | Susceptible/challenged | Percentage of protected |
| One day | b 5 | 7 | 6 | 1 | c 19/20 | 0/20 | 100 |
| 4 weeks | 0 | 5 | 5 | 0 | 10/10 | 0/10 | 100 |
| Controls: | | | | | | | |
| One day | | | | | | 10/10 | 0 |
| 4 weeks | | | | | | 10/10 | 0 | a Det.=detectable, i.e., palpable mild reaction; Sl.=slight, i.e., visible slight swelling; Mod.=moderate, i.e., definite moderate swelling; Sev.=severe, i.e., swelling, redness, scabbing and necrosis.
b Number of chickens reacted.
c Number of reacting/number vaccinated.

All vaccinated chickens with one exception showed only mild or moderate local reactions eight days following vaccination. The reactions in all cases were always limited to the area of virus application. The virus did not spread from the site of inoculation to other areas of the body. Satisfactory protection developed in the vaccinated chickens against the challenge virus. All control birds showed typical fowl pox reactions following challenge.

Minimum effective dose determination.—The minimum effective dose of this DTC fowl pox virus vaccine was studied in 4-week-old broilers. The freeze-dried vaccine was reconstituted with standard diluent and then diluted decimally $10^{-1}$ through $10^{-4}$. The virus titer of the reconstituted vaccine was determined simultaneously with age chickens. The results indicate that vaccines prepared from avian pox viruses propagated in duck tissue cultures (DTC) are as readily prepared and as equally satisfactory for immunization of chickens against fowl pox as heretofore known vaccines prepared from avian pox viruses propagated in chicken tissue cultures (CTC).

Both duck and chicken fibroblast cell cultures were prepared and maintained according to the above-noted modified procedure of Dulbecco and Vogt. The growth medium consisted of 0.5% lactalbumin hydrolysate, 10% lamb serum in Hank's basic salt solution with addition of antibiotics, e.g., penicillin and dihydrostreptomycin. The monolayers of duck or chick fibroblast cells were generally well developed in twenty-four hours. After forty-eight hours incubation, the tissue cultures were inoculated with the seed virus. Following a few passages all three viruses grew well in both duck and chicken embryonic fibroblast cells. Cytopathogenic effects (CPE) of the viruses were observed in the tissue culture and the titer of the virus was measured by the dropped chorioallantoic membrane (CAM) technique in nine to eleven-day-old embryos. See results in Table V.

TABLE V.—INCUBATION TIME AND TITER OF AVIAN POX VIRUSES PROPAGATED IN CHICKEN AND DUCK TISSUE CELL CULTURES

| Virus | Chicken Fibroblast Cells | | Duck Fibroblast Cells | |
|---|---|---|---|---|
|  | CPE in days | $Log_{10}EID_{50}/$ ml. | CPE in days | $Log_{10}EID_{50}/$ ml. |
| Fowl Pox | 3-4 | 6.8 | 4-5 | 6.8 |
| Turkey Pox | 3-4 | 6.8 | 4-5 | 6.5 |
| Pigeon Pox | 3-4 | 5.8 | 4-5 | 5.8 |

All viruses showed CPE in both duck and chicken embryo fibroblast cells three to five days following virus inoculation. One of the differences between the chicken and duck tissue culture propagated avian pox viruses was the slower development of CPE in duck fibroblast cells, i.e., approximately one day longer. The avian pox viruses also had a more destructive effect on the chicken cells than on the duck cells. The chicken fibroblast cells showed a complete destruction and sloughed off from the glass surface three to four days following inoculation. Whereas the duck fibroblast cells, although degenerated, were attached to the glass surface even six days following inoculation. Nevertheless this rapid destruction of chicken cells did not effect the virus titer either positively or negatively. The titers of the viruses were similar in both tissue culture systems with the exception of the pigeon pox virus which had lower titers in both cell cultures.

Freeze-dried vaccines prepared from the tissue culture propagated avian pox viruses were tested for virulence and antigenicity in different age chickens. In the first experiment, fowl pox and pigeon pox viruses propagated in duck and chicken cell cultures were used for vaccination of one-day-old and two-week-old chickens. The vaccines were administered to birds by the wing-web stab method. Table VI shows the reaction in chickens eight days following the wing-web application of the fowl pox vaccines.

TABLE VI.—COMPARATIVE EVALUATION OF REACTIONS IN CHICKENS EIGHT DAYS FOLLOWING WING WEB ADMINISTRATION OF FOWL POX VIRUS VACCINE PROPAGATED IN CHICKEN AND DUCK TISSUE CULTURES

| Bird Age at Vaccination | Vaccine Virus | Reaction Following Vaccination [a] | | | | | Reacted/ Vaccinated |
|---|---|---|---|---|---|---|---|
|  |  | Neg. | Det. | Mild | Mod. | Sev. |  |
| 1 day | CTC | 4 | 13 | 18 | 2 | 0 | 33/37 |
|  | DTC | 4 | 14 | 19 | 3 | 0 | 36/40 |
| 2 weeks | CTC | 0 | 4 | 32 | 2 | 0 | 38/38 |
|  | DTC | 0 | 3 | 35 | 2 | 0 | 40/40 |

[a] Neg.=negative; Det.=detectable; Mod.=moderate; Sev.=severe.

Both duck and chicken tissue culture propagated vaccines resulted in mild local reaction. A considerable percentage of the one-day-old chicken groups showed only slight detectable lesions or no take reaction at all. There was no difference between the effect of the duck and chicken propagated virus.

Almost the same results were observed with the similarly prepared pigeon pox vaccines. Slight local reaction developed in the majority of the birds eight days post-vaccination with a considerable milder tendency in the one-day-old group. As it is demonstrated in Table VII, no difference was observed in the effect of the duck and chicken propagated virus.

TABLE VII.—COMPARATIVE EVALUATION OF REACTIONS IN CHICKENS EIGHT DAYS FOLLOWING WING WEB ADMINISTRATION OF PIGEON POX VIRUS VACCINE PROPAGATED IN CHICKEN AND DUCK CELL CULTURES

| Bird Age at Vaccination | Vaccine Virus | Reaction Following Vaccination [a] | | | | | Reacted/ Vaccinated |
|---|---|---|---|---|---|---|---|
|  |  | Neg. | Det. | Mild | Mod. | Sev. |  |
| 1 day | CTC | 5 | 10 | 15 | 7 | 0 | 32/37 |
|  | DTC | 3 | 10 | 20 | 6 | 0 | 36/39 |
| 2 weeks | CTC | 0 | 1 | 34 | 3 | 0 | 38/36 |
|  | DTC | 0 | 0 | 33 | 6 | 0 | 39/39 |

[a] See footnote (a) of Table VI.

Table VIII shows the summarized result of the potency tests in the above mentioned vaccinated groups.

TABLE VIII.—IMMUNE RESPONSE OF YOUNG CHICKENS VACCINATED WITH TISSUE-CULTURE-PROPAGATED FOWL POX AND PIGEON POX VIRUS VACCINES

| Vaccine Virus | Challenge Results in Chickens [a] | |
|---|---|---|
|  | One-day-old | Two-week-old |
| Fowl Pox: |  |  |
| CTC | [b] 1/10 | 0/10 |
| DTC | 1/10 | 0/10 |
| Pigeon Pox: |  |  |
| CTC | 2/10 | 0/10 |
| DTC | 1/10 | 0/10 |
| Controls | 10/10 | 10/10 |

[a] One month post-vaccination.
[b] Susceptible/challenged.

Ten vaccinated birds and ten controls were challenged twenty-eight days following vaccination. The challenge virus was administered by the wing-web stab method in the opposite wing from that used for vaccination. Reactions were observed seven and eight days following challenge. Showing a few take reactions following challenge, the one-day-old groups did not resist the challenge as well as the two-week-old group which was completely protected. There was no significant difference between the duck and chicken-propagated fowl or pigeon pox virus vaccines measured by the immune response of chickens.

Although the invention has been described in considerable detail with reference to certain preferred embodiments thereof, it will be understood that variations and modifications can be effected within hte spirit and scope of the invention as described hereinabove and as defined in the appended claims.

The subject matter which we regard as our invention is particularly pointed out and distinctly claimed as follows:

1. In a process of preparing an avian pox virus vaccine, the improvement which comprises propagating an avian pox virus in a tissue culture medium of duck embryo cells.

2. A process according to claim 1 which comprises serially passing an avian pox virus in duck embryo tissue cultures.

3. A process according to claim 1 in which the duck embryo cells are trypsinized before use.

4. A process according to claim 1 in which a tissue culture medium of duck embryo fibroblast cells are used.

5. A process according to claim 1 in which fowl pox virus is used.

6. A process according to claim 1 in which pigeon pox virus is used.

7. A process according to claim 1 in which turkey pox virus is used.

8. An avian pox virus vaccine prepared from the avian pox virus propagated according to the process of claim 1.

9. A fowl pox virus vaccine according to claim 8.

10. A pigeon pox virus vaccine according to claim 8.

References Cited

UNITED STATES PATENTS 2,767,117  10/1956  Crawley _____ 167—78

ALVIN E. TANENHOLTZ, *Primary Examiner.*

U.S. Cl. X.R.

195—1.3